United States Patent [19]

Ono

[11] 3,885,949

[45] May 27, 1975

[54] METHOD FOR IMPROVEMENT OF CITRUS FRUITS IN QUALITY

[75] Inventor: Masayuki Ono, Osaka, Japan

[73] Assignee: Tanabe Seiyaku Co., Limited, Osaka, Japan

[22] Filed: Jan. 29, 1973

[21] Appl. No.: 327,796

Related U.S. Application Data

[63] Continuation-in-part of Ser. No. 47,594, June 18, 1970, abandoned.

[30] Foreign Application Priority Data

June 18, 1970 Japan.............................. 45-48752

[52] U.S. Cl...................................... 71/79; 99/103
[51] Int. Cl............................................. A01n 9/00
[58] Field of Search ............. 71/77, 79, 65, DIG. 1, 71/88

[56] References Cited
UNITED STATES PATENTS 2,563,855   8/1951   McColloch et al. .................. 99/103
2,924,521   2/1960   Hewitt et al. ......................... 99/103
3,307,954   3/1967   Blakemore............................ 99/103
3,537,838   11/1970  Oeriu.................................... 71/77

FOREIGN PATENTS OR APPLICATIONS 1,525,297   4/1968   France.................................... 71/79

Primary Examiner—James O. Thomas, Jr.
Attorney, Agent, or Firm—Bierman & Bierman

[57] ABSTRACT

A method for improvement of citrus fruits in quality which comprises foliage application of at least one of protease, lipase, naringinase and hesperidinase with or without pectinase to the trees of citrus fruits at the period of ovary enlargement whereby the acid contents in the fruits are highly decreased and the sweetness ratios of the fruits are much increased.

11 Claims, No Drawings

METHOD FOR IMPROVEMENT OF CITRUS FRUITS IN QUALITY

This application is a continuation-in-part of Ser. No. 47,594 filed June 18, 1970 now abandoned, which claims the priority of Japanese Application 48752/1969 - June 20, 1969.

The present invention relates to a method of improvement of citrus fruits in quality. More particularly, it relates to a method for decreasing the sour taste of citrus fruits.

As well known, a variety of citrus fruits including orange (Citrus Natsudaidai Hayata, Citrus Unshu Marcovitch), mandarines (Citrus reticulata Blanco, Citrus Tonki Hort ex Tanaka), tangerines (Citrus Tangerina Hort et Tanaka), grape fruits (Citrus taradisi Macf.) and shaddocks (Citrus grandis Osbeck, Citrus decumana L.) are much consumed in human life. Some of them possess a relatively high acid content and are too sour for children.

In order to improve such taste, some attempts have been made. For instance, 2,4,5-trichlorophenoxypropionic acid ethanolamine salt (2,4,5-TE) and arsenic agents are practically used for decreasing the acid contents in citrus fruits. However, the acid-decreasing effect of 2,4,5-TE is indefinite and unreliable. The acid-decreasing effect of arsenic agents is of satisfaction, but those agents are apt to cause chemical injury on trees and are afraid to result in accumulative toxicity to human beings.

It has now been found that the foliage application of certain enzymes to citrus fruit trees is effective in decreasing the acid contents in the fruits and improving the sour taste. The use of any enzyme as an acid-decreasing agent in citrus fruits has never been attempted, and the above finding is of unexpected and surprising nature.

Accordingly, a basic object of the present invention is to embody a method for improvement of citrus fruits in quality. Another object of this invention is to embody a method for decreasing the acid contents in citrus fruits. A further object of the invention is to embody an agricultural composition for improvement of the sour taste of citrus fruits. These and other objects will be apparent to those conversant with the art to which the present invention pertains from the subsequent descriptions.

The method of this invention comprises foliage application of at least one of protease, lipase, naringinase and hesperidinase to citrus fruit trees at the period of ovary enlargement so as to decrease the acid contents in the fruits.

As the active ingredient in this invention, there are used one or more of protease, lipase, naringinase and hesperidinase. These enzymes may be employed, if desired, together with any other enzyme such as pectinase so as to increase the acid-decreasing effect.

The origins of the enzymes are not critical in this invention, and the enzymes may be obtained from various sources. Examples of the preferred enzymes are as follows: protease produced by *Bacillus subtilis* [Journal of Agricultural Chemical Society of Japan, 32, 230 (1958)], lipase produced by *Rhizopus delemar* (Bois) Wehmer et Hans [U.S. Pat. No. 3,262,863], lipase produced by *Candida paralipolytica* [Agricultural Biological Chemistry, 30, 351 (1966)], naringinase produced by Aspergillus, Penicillium or Rhizopus organisms [U.S. Pat. No. 1,932,833; U.S. Pat. No. 2,950,974]; naringinase produced by *Aspergillus niger* [Japanese Pat. No. 453,014], hesperidinase produced by *Aspergillus niger* [Journal of Agricultural Chemical Society of Japan, 37, 84 (1963) and Japanese Pat. No. 213,444], pectinase produced by *Aspergillus niger* [Journal of Agricultural Chemical Society of Japan, 43, 99 (1969)], pectinase produced by Coniothyrium diplodiella [Journal of Fermentation Association of Japan (Hakko Kyokai Shi), 20, 282 (1962)], etc.

The active ingredient may be applied as such on foliage but the application is usually effected in conventional preparation forms such as aqueous solution, emulsion and dust. If desired, wetting agents (e.g. polyoxyethylene glycol alkylphenol ether, sodium ligninsulfonate, alkylbenzenesulfonates, higher alcohol sulfuric acid ester) and/or excipients (e.g. sellaite, saccharides) may be incorporated into such preparations. The preparations may also be used together with any other inorganic manure containing potassium, phosphor, boron and the like which has usually been used for applying on foliage.

The amount of the active ingredient to be applied depends on the kind of the enzyme. In case of protease, for instance, the application is normally effected once or twice by the use of a 0.01 to 1.0 percent (by weight) aqueous solution of the enzyme of about 30,000 units per g in potency at a rate of 5 to 18 liters per tree. In case of lipase, 5 to 15 liters of a 0.001 to 1.0 percent (by weight) aqueous solution of the enzyme of 10,000 units per g in potency are usually applied to each tree in 1 to 5 times. In case of naringinase, a 0.001 to 1.0 percent (by weight) aqueous solution of the enzymes of 100 units per g in potency may be ordinarily applied at a rate of 2 to 15 liters per tree. In case of hesperidinase, 5 to 20 liters of a 0.01 to 1.0 percent (by weight) aqueous solution of the enzyme of 100 units per g in potency are usually applied to each tree in 1 to 2 times.

For realizing the notable acid-decreasing effect, it is desirable to make the application at the period of ovary enlargement, i.e. 2 to 15 weeks, particularly 3 to 12 weeks after full bloom.

Although the said enzymes are effective in decreasing the acid contents in citrus fruits, the concrete effect is more or less associated with the kind and amount of the enzyme as employed. When, for instance, protease is used alone or in combination with pectinase in the ranges of the amounts as above mentioned, the acid contents of the citrus fruits in the medicated plot may be 0.3 to 0.8 percent and 0.5 to 1.0 percent less than those in the non-medicated plot, respectively. Further, the use of lipase in the said range is generally result in 0.3 to 1.4 percent less. Furthermore, the use of naringinase in the said range ordinarily decreases the acid content in 0.3 to 1.0 percent.

When hesperidinase is applied to trees of orange (Citrus Unshiu Marco), it is effective in decreasing the acid contents and in increasing the sugar contents and thereby increasing the sweetness ratio and can give oranges having excellent quality in taste. Furthermore, when hesperidinase is applied to trees of orange (Citrus Unshiu Praecox), it is extremely effective in decreasing the high acid contents which is the disadvantage of the orange and further it has an advantage of earlier harvest in comparison with the usual case.

Practical and presently preferred embodiments of the present invention are shown in the following examples wherein the enzymatic potency was determined as follows:

Protease potency: - Dry casein (1.2 g) was dissolved in 0.05 M secondary sodium phosphate solution (160 ml), and water was added thereto to make 200 ml. To the solution (5 ml), a protease solution (0.002 M calcium acetate solution) was added, and the resultant mixture was shaken at 30°C for 10 minutes. After the addition of a protein precipitation reagent, the precipitate was separated by filtration. To the filtrate (2 ml), 0.55 M sodium carbonate solution and Folin's reagent were added, and the resultant mixture was subjected to colorimetry. The enzymatic potency which produced 1 μg of tyrosine per minute of the reaction time was taken as 1 unit.

Lipase potency:- The potency of lipase which liberated a free acid corresponding to 1/20 N sodium hydroxide solution (1 ml) on the reaction to olive oil at pH 5.0 at 30°C for 150 minutes was taken as 1 unit.

Naringinase potency:- The potency of naringinase which afforded 1 mg of saccharides in terms of rhamnose on the reaction with naringin in pH 4.0 at 40°C for 30 minutes was taken as 1 unit.

Hesperidinase potency:- The potency of hesperidinase which afforded 1 mg of saccharides in terms of rhamnose on the reaction with hesperidine in pH 3.8 at 40°C for 30 minutes was taken as 1 unit.

Pectinase potency:- The potency of pectinase which decreased half the viscosity of a solution of dry citrus pectin (1 g) in 0.05 M acetate buffer (pH 3.5) in 10 minutes was taken as 1 unit.

EXAMPLE 1

On the 28th day after full bloom, a 100 or 300 fold dilution of the protease preparation ["Neutral Protease Tanabe" manufactured by Tanabe Seiyaku Co., Ltd.] produced by Bacillus subtilis and having 30,000 units/g (pH 7.0) in protease potency and trace (pH 3.5) in pectinase potency was applied to trees of orange (Citrus Natsudaidai Hayata) aged 12 years by a sprayer at a rate of 3 liters per tree. In case of the 300 fold dilution, an additional application at the same rate was made on the 35th day. The fruits were harvested on the 336th day, and the fruit weight, the juice volume, the sugar content, the citric acid weight and the sweetness ratio (sugar content/citric acid weight) were measured. Besides, the application of a 300 fold dilution of lead arsenate as control was made in the similar manner on the 28th day after full bloom, and the said values were also measured. The results are shown in Table 1.

EXAMPLE 2

On the 30th day after full bloom, a 200 fold dilution fo the protease preparation as in Example 1 was applied to trees of orange (Citrus Natsudaidai Hayata) aged 13 years in two plots by a sprayer at a rate of 3 liters per tree. In one of the plots, a 200 fold dilution of the pectinase preparation ["Penase" manufactured by Tanabe Seiyaku Co., Ltd.] produced by *Aspergillus niger* and having 250 units/g (pH 7.0) in protease potency, 800 units/g (pH 3.5) in pectinase potency and 6,300 units/g (pH 3.5) in hemicellulase potency was simultaneously applied at a rate of 3 liters per tree. An additional application in the same manner as above was made on the 43rd day. The fruits were harvested on the 246th day and the 308th day, and the sugar content, the citric acid weight and the sweetness ratio were measured. Besides, the application of a 300 fold dilution of lead arsenate as control was made in the similar manner on the 30th day after full bloom, and the said values were also measured. The results are shown in Table 2.

Table 1

| Test preparation | Fruit weight (g) | Juice volume (ml) | Sugar content (g/100 ml of juice) | Citric acid weight (g/100 ml of juice) | Sweetness ratio |
| --- | --- | --- | --- | --- | --- |
| Protease preparation (100 fold dilution) | 376 | 283 | 9.9 | 1.90 | 5.21 |
| Protease preparation (300 fold dilution) | 374 | 289 | 9.7 | 1.96 | 4.95 |
| Lead arsenate solution (300 fold dilution) | 343 | 297 | 9.8 | 1.91 | 5.13 |
| Untreated | 320 | 290 | 10.2 | 2.43 | 4.20 |

Table 2

| Cropped date | 246th day after full bloom | | | 308th day after full bloom | | |
| --- | --- | --- | --- | --- | --- | --- |
| Test preparation | Sugar content (g/100 ml of juice) | Citric acid weight (g/100 ml of juice) | Sweetness ratio | Sugar content (g/100 ml of juice) | Citric acid weight (g/100 ml of juice) | Sweetness ratio |
| Protease preparation (200 fold dilution) | 9.5 | 2.60 | 3.65 | 10.0 | 2.39 | 4.18 |
| Protease preparation (200 fold dilution) + | 9.8 | 2.46 | 3.98 | 10.2 | 2.01 | 5.07 |

Table 2—Continued

| Cropped date | 246th day after full bloom | | | 308th day after full bloom | | |
|---|---|---|---|---|---|---|
| Test preparation | Sugar content (g/100 ml of juice) | Citric acid weight (g/100 ml of juice) | Sweetness ratio | Sugar content (g/100 ml of juice) | Citric acid weight (g/100 ml of juice) | Sweetness ratio |
| Pectinase preparation (200 fold dilution) | | | | | | |
| Lead arsenate solution (300 fold dilution) | 9.5 | 2.71 | 3.50 | 10.6 | 2.53 | 4.19 |
| Untreated | 10.1 | 3.28 | 3.08 | 10.3 | 2.82 | 3.65 |

EXAMPLE 3

On the 28th day after full bloom a 100 or 300 fold dilution of the lipase preparation ["Talipase" manufactured by Tanabe Seiyaku co., Ltd.] produced by Rhizopus delemar and having 10,000 units/g (pH 5.6) in lipase potency, 40 units/g (pH 3.5) in protease potency and 0 unit/g (pH 4.8) in amylase potency was applied to trees of orange (Citrus Natsudaidai Hayata) aged 13 years by a sprayer at a rate of 3 liters per tree. The fruits were harvested on the 190th day, and the fruit weight, the juice volume, the sugar content, the citric acid weight and the sweetness ratio (sugar content/citric acid weight) were measured. Besides, the application of a 300 fold dilution of lead arsenate as control was made in the similar manner on the 28th day after full bloom, and the said values were also measured. The results are shown in Table 3.

EXAMPLE 4

On the 30th day after full bloom, a 100 or 300 fold dilution of the lipase preparation as in Example 3 was applied to trees of orange (Citrus Natsudaidai Hayata) aged 13 years by a sprayer at a rate of 3 liters per tree. In case of the 300 fold dilution, and additional application at the same rate was made on the 43th day. The fruits were harvested on the 190rd day and the 278th day, and the sugar content, the citric acid weight and the sweetness ratio were measured. Besides, the application of a 300 fold dilution of lead arsenate as control was made in the similar manner on the 30th day after full bloom, and the said values were also measured. The results are shown in Table 4.

Table 4

| Cropped date | 190th day after full bloom | | | 278th day after full bloom | | |
|---|---|---|---|---|---|---|
| Test preparation | Sugar content (g/100 ml of juice) | Citric acid weight (g/100 ml of juice) | Sweetness ratio | Sugar content (g/100 ml of juice) | Citric acid weight (g/100 ml of juice) | Sweetness ratio |
| Lipase preparation (100 fold dilution) | 9.8 | 2.71 | 3.62 | 10.2 | 2.34 | 4.36 |
| Lipase preparation (300 fold dilution) | 9.9 | 1.70 | 5.82 | 10.1 | 1.40 | 7.21 |
| Lead arsenate solution (300 fold dilution) | 9.8 | 2.58 | 3.80 | 10.6 | 2.53 | 4.19 |
| Untreated | 10.1 | 3.11 | 3.25 | 10.3 | 2.82 | 3.65 |

EXAMPLE 5

On the 34th day after full bloom, a 0.001 percent (by weight) solution of the naringinase preparation Table 3

| Test preparation | Fruit weight (g) | Juice volume (ml) | Sugar content (g/100 ml of juice) | Citric acid weight (g/100 ml of juice) | Sweetness ratio |
|---|---|---|---|---|---|
| Lipase preparation (100 fold dilution) | 305 | 332 | 9.8 | 2.73 | 3.59 |
| Lipase preparation (300 fold dilution) | 280 | 281 | 9.9 | 1.70 | 5.82 |
| Lead arsenate solution (300 fold dilution) | 307 | 319 | 9.9 | 2.59 | 3.82 |
| Untreated | 286 | 321 | 10.2 | 3.01 | 3.39 |

["Kumitanase" manufactured by Tanabe Seiyaku Co., Ltd.] produced by Aspergillus niger and having 100 units/g in naringinase potency was applied to trees of orange (Citrus Natsudaidai Hayata) aged 15 years by a sprayer at a rate of 15 liters per tree. The fruits were harvested on the 180th day and the 265th day, and the fruit weight, the juice volume, the sugar content, the citric acid weight and the sweetness ratio were measured. Besides, the said solution of the naringinase preparation was applied to trees of orange (Citrus Natsudaidai Hayata) aged 15 years in the similar manner on the 34th day after full bloom but in the next season and the fruits were harvested on the 180th day and subjected to measurement. The results are shown in Table 5 wherein the numerals in parenthesis are those measured on the fruits from the untreated trees.

EXAMPLE 6

On the 61st day after full bloom, a 1000 fold dilution of the hesperidinase preparation produced by *Aspergillus niger* was applied to trees of orange (Citrus Unshiu Praecox) aged 15 years by a sprayer at a rate of 10 liters per tree. The fruits were harvested on the 113th, 143rd and 163rd day, and the sugar contents, the citric acid weight and the sweetness ratio (sugar content/citric acid weight) were measured. Besides, the application of a 800 fold dilution of lead arsenate as control was made in the similar manner on the 61st day after full bloom, and the said values were also measured.

The results are shown in Table 6.

As made clear from the test results, in the products treated with the hesperidinase preparation the citric acid weight was significantly decreased and further the sugar content and also the sweetness ratio were increased, and the products wee excellent in taste.

EXAMPLE 7

On the 65th day after full bloom, a 1000 fold dilution of the hesperidinase preparation produced by *Aspergillus niger* was applied to trees of orange (Citrus Unshiu Marco) aged 20 years by a sprayer at a rate of 10 liters per tree. The fruits were harvested on the 163rd, 184th and 209th day, and the sugar contents, the citric acid weight and the sweetness ratio were measured. The results are shown in Table 7.

Table 5

| Harvested date | Fruit weight (g) | Juice volume (ml) | Sugar content (g/100 ml of juice) | Citric acid weight (g/100 ml of juice) | Sweetness ratio |
|---|---|---|---|---|---|
| 180th day after full bloom | 376 (340) | 345 (307) | 8.0 (8.6) | 2.19 (2.94) | 3.65 (2.93) |
| 265th day after full bloom | 280 (311) | 240 (275) | 7.0 (7.4) | 1.57 (2.48) | 4.46 (2.98) |
| 180th day after full bloom (next season) | 364 (358) | 331 (324) | 8.5 (8.2) | 2.15 (2.42) | 3.95 (3.39) |

Table 6

| Cropped date | 113th day after full bloom | | | 143rd day after full bloom | | | 163rd day after full bloom | | |
|---|---|---|---|---|---|---|---|---|---|
| Test preparation | Sugar content (g/100 ml of juice) | Citric acid weight (g/100 ml of juice) | Sweetness ratio | Sugar content (g/100 ml of juice) | Citric acid weight (g/100 ml of juice) | Sweetness ratio | Sugar content (g/100 ml of juice) | Citric acid weight (g/100 ml of juice) | Sweetness ratio |
| Hesperidinase preparation (1000 fold dilution) | 8.4 | 1.41 | 5.96 | 9.0 | 1.02 | 8.82 | 13.0 | 0.85 | 15.29 |
| Lead arsenate solution (800 fold dilution) | 8.5 | 1.96 | 4.34 | 8.1 | 1.08 | 7.50 | 11.1 | 0.73 | 15.21 |
| Untreated | 7.5 | 2.57 | 2.92 | 8.2 | 1.32 | 6.21 | 11.2 | 1.13 | 9.91 |

Table 7

| Cropped date | 163rd day after full bloom | | | 184th day after full bloom | | | 209th day after full bloom | | |
|---|---|---|---|---|---|---|---|---|---|
| Test preparation | Sugar content (g/100 ml of juice) | Citric acid weight (g/100 ml of juice) | Sweetness ratio | Sugar content (g/100 ml of juice) | Citric acid weight (g/100 ml of juice) | Sweetness ratio | Sugar content (g/100 ml of juice) | Citric acid weight (g/100 ml of juice) | Sweetness ratio |
| Hesperidinase preparation (1000 fold dilution) | 11.2 | 1.15 | 9.74 | 12.5 | 1.05 | 11.90 | 13.2 | 1.01 | 13.07 |
| Untreated | 8.96 | 1.43 | 6.27 | 10.2 | 1.40 | 7.29 | 10.6 | 1.34 | 7.91 |

What is claimed is:

1. A method for decreasing the acid content of the fruit of a citrus fruit tree comprising the steps of applying to the foliage of the tree, at the period of ovary enlargement of the fruit, at least one enzyme selected from the group consisting of protease, lipase, naringinase and hesperidinase.

2. The method according to claim 1 further including the step of applying pectinase to the foliage of the tree at said period of ovary enlargement.

3. The method according to claim 1, wherein an aqueous solution of said enzyme is applied.

4. The method according to claim 1, wherein the application is made 2 to 15 weeks after full bloom.

5. The method according to claim 1, wherein the application is made 3 to 12 weeks after full bloom.

6. The method according to claim 1, wherein said enzyme is a 0.01 to 1.0 percent by weight aqueous solution of protease having a potency of about 30,000 units per gram, and from 5 to 18 liters of this aqueous solution is applied to said tree, at said period of ovary enlargement.

7. The method according to claim 6, further including a second application to said tree, at said period of ovary enlargement, of from 5 to 18 liters of the aqueous solution.

8. The method according to claim 1, wherein said enzyme is a 0.001 to 1.0 percent by weight aqueous solution of lipase having a potency of 10,000 units per gram, and from 5 to 15 liters of the solution is applied to the tree.

9. The method according to claim 8, wherein said application is repeated, the total number of applications being not more than 5.

10. The method according to claim 1, wherein said enzyme is a 0.001 to 1.0 percent by weight aqueous solution of naringinase having a potency of 100 units per gram, and from 2 to 15 liters of the solution is applied to the tree.

11. The method according to claim 1, wherein said enzyme is a 0.01 to 1.0 percent by weight aqueous solution of hesperidinase having a potency of 100 units per gram, and from 5 to 20 liters of the solution is applied to the tree.

* * * * *